United States Patent
Ju et al.

(10) Patent No.: US 11,371,320 B2
(45) Date of Patent: Jun. 28, 2022

(54) EXPERIMENTAL METHOD AND SYSTEM FOR SIMULATING EVOLUTION OF RESERVOIR FRACTURE STRESS FIELD

(71) Applicant: CHINA UNIVERSITY OF MINING AND TECHNOLOGY, BEIJING, Beijing (CN)

(72) Inventors: Yang Ju, Beijing (CN); Jinxin Song, Beijing (CN); Peng Liu, Beijing (CN)

(73) Assignee: CHINA UNIVERSITY OF MINING AND TECHNOLOGY, BEIJING, Beijing (CN)

( * ) Notice: Subject to any disclaimer, the term of this patent is extended or adjusted under 35 U.S.C. 154(b) by 0 days.

(21) Appl. No.: 17/296,224

(22) PCT Filed: Apr. 24, 2020

(86) PCT No.: PCT/CN2020/086529
§ 371 (c)(1),
(2) Date: May 22, 2021

(87) PCT Pub. No.: WO2021/212442
PCT Pub. Date: Oct. 28, 2021

(65) Prior Publication Data
US 2022/0049582 A1  Feb. 17, 2022

(51) Int. Cl.
*E21B 41/00* (2006.01)
*G01V 99/00* (2009.01)
*E21B 43/26* (2006.01)

(52) U.S. Cl.
CPC ............ *E21B 41/00* (2013.01); *G01V 99/005* (2013.01); *E21B 43/26* (2013.01); *E21B 2200/20* (2020.05)

(58) Field of Classification Search
CPC ...... E21B 41/00; E21B 2200/20; E21B 43/26; G01V 99/005
(Continued)

(56) References Cited

U.S. PATENT DOCUMENTS

| 2015/0198013 A1 | 7/2015 | Taabbodi |
| 2015/0355158 A1* | 12/2015 | Lander ................. G01N 33/385 |
| | | 702/2 |
| 2019/0360904 A1* | 11/2019 | Ju .......................... G06T 17/05 |

FOREIGN PATENT DOCUMENTS

| CN | 103437746 A | 12/2013 |
| CN | 104594872 A | 5/2015 |

(Continued)

OTHER PUBLICATIONS

Roy, Pratanu, et al. "Studying the impact of thermal cycling on wellbore integrity during CO2 injection." 50th US Rock Mechanics/Geomechanics Symposium. OnePetro, 2016. pp. 1-12. (Year: 2016).*
(Continued)

*Primary Examiner* — John E Johansen
(74) *Attorney, Agent, or Firm* — Yue (Robert) Xu; Apex Attorneys at Law, LLP

(57) ABSTRACT

An experimental method and system for simulating the evolution of reservoir fracture stress field, the experimental method comprises the following steps: (S1) preparing horizontal well fracturing model (100); (S2) applying boundary loads and constraints to the horizontal well fracturing model (100); (S3) injecting fracturing fluid or fracturing gas into a fracturing wellbore (130) of the horizontal well fracturing model (100) after loading for fracturing; in a fracturing stage, a photoelastic fringe image of the horizontal well fracturing model (100) is obtained by an optical phase shift method; the fracturing stage comprises an initial state before fracturing fluid or fracturing gas is injected and an end state after fracturing is completed. The experimental method and system can effectively simulate the whole process of horizontal well fracturing, and accurately obtain the variation law of reservoir stress field and its influence on crack propagation during horizontal well fracturing.

15 Claims, 3 Drawing Sheets

(58) Field of Classification Search
USPC .......................................................... 703/10
See application file for complete search history.

(56) References Cited

FOREIGN PATENT DOCUMENTS

| | | |
|---|---|---|
| CN | 104895550 A | 9/2015 |
| CN | 105019877 A | 11/2015 |
| CN | 108693042 A | 10/2018 |
| CN | 108732021 A | 11/2018 |
| CN | 110500090 A | 11/2019 |

OTHER PUBLICATIONS

Jo, Jun Ho, et al. "Development of a 3D printer for concrete structures: laboratory testing of cementitious materials." International Journal of Concrete Structures and Materials 14.1 (2020). pp. 1-11. (Year: 2020).*
Guo, Tiankui, et al. "Experimental study of hydraulic fracturing for shale by stimulated reservoir volume." Fuel 128 (2014). pp. 373-380. (Year: 2014).*
International Search Report for PCT/CN2020/086529 dated Jan. 26, 2021, ISA/CN.

* cited by examiner

EXPERIMENTAL METHOD AND SYSTEM FOR SIMULATING EVOLUTION OF RESERVOIR FRACTURE STRESS FIELD

The present application is a National Phase entry of PCT Application No. PCT/CN2020/086529, filed on Apr. 24, 2020, the entire disclosure of which is incorporated herein by reference.

FIELD

The present application relates to the technical field of oil and gas field development, and in particular to an experimental method and system for simulating the evolution of reservoir fracture stress field.

BACKGROUND

In the process of unconventional oil and gas hydraulic fracturing, multi-perforation cluster stage fracturing is a common measure to increase production. In the multi-stage fracturing process, the variation of reservoir stress field plays an important role in the propagation of multiple cracks, the length and volume of the multiple cracks and even the output of oil and gas resources after a horizontal well is put into production. Therefore, it is extremely important to study the variation law of the stress field in stage fracturing and its influence on crack propagation.

Different fracturing methods and different perforation spacings are used in stage fracturing, which have an important impact on the fracturing efficiency and stimulation effect of the horizontal well. At present, traditional numerical methods and experimental researches study the stress field of the horizontal well during fracturing. These methods can obtain the stress field state and crack state after fracturing, but cannot describe the whole variation law of stress field around cracks intuitively and quantitatively. In addition, the calculation accuracy of numerical methods is limited by parameter settings, and the accuracy and reliability of the results may not be guaranteed.

In view of this, how to provide an experimental method and apparatus for simulating the evolution of a reservoir fracture stress field, which may accurately obtain the change information of reservoir fracture stress field in the fracturing process, and intuitively and quantitatively display the variation law of stress field and the change of internal structure of reservoir, is a technical problem to be solved by those skilled in the art at present.

SUMMARY

An object of the present application is to provide an experimental method and system for simulating the evolution of a reservoir fracture stress field, which may effectively simulate the whole process of horizontal well fracturing, and accurately obtain the variation law of reservoir stress field and its influence on crack propagation during horizontal well fracturing.

The present application provides an experimental method for simulating the evolution of a reservoir fracture stress field, which includes the following steps:
preparing a horizontal well fracturing model;
applying boundary loads and constraints to the horizontal well fracturing model;
injecting fracturing fluid or fracturing gas into a fracturing wellbore of the horizontal well fracturing model after loading for fracturing; specifically, in a fracturing stage, a photoelastic fringe image of the horizontal well fracturing model is obtained by an optical phase shift method; the fracturing stage includes an initial state before fracturing fluid or fracturing gas is injected and an end state after fracturing is completed.

According to the experimental method, that preparing the horizontal well fracturing model includes the following steps:
establishing a digital model of a real reservoir, in which the digital model has a preset wellbore space;
making a reservoir 3D model according to the digital model; in which the material of the reservoir 3D model is similar to a real reservoir in composition and ratio, and has photosensitivity and stress birefringence effects;
preparing a wellbore assembly, in which the wellbore assembly includes an outer sleeve and the fracturing wellbore inserted in the outer sleeve; the outer sleeve has multiple sleeve perforation pairs distributed along an axial direction, two sleeve perforations of each sleeve perforation pair are distributed along a radial direction of the outer sleeve, and the radial distribution direction of each sleeve perforation pair is consistent; the fracturing wellbore has fracturing perforation pairs having the same number with the sleeve perforation pairs, two fracturing perforations of each fracturing perforation pair are distributed along a radial direction of the fracturing wellbore, and multiple fracturing perforation pairs are distributed along an axial direction of the fracturing wellbore and correspond to the axial positions of multiple sleeve perforation pairs one by one; the circumference of the position where each fracturing perforation pair of the fracturing wellbore is located is hermetical except a position between the fracturing perforation and the outer sleeve;
inserting the wellbore assembly into a preset wellbore space of the reservoir 3D model to form the horizontal well fracturing model, in which the outer sleeve is tightly matched with the reservoir 3D model.

According to the experimental method described above, the horizontal well fracturing model includes a first fracturing model for sequential fracturing; the fracturing wellbore includes a first fracturing wellbore for sequential fracturing, in which multiple fracturing perforation pairs of the first fracturing wellbore are staggered in the circumferential direction of the first fracturing wellbore; the first fracturing wellbore, the outer sleeve and the reservoir 3D model are assembled to form the first fracturing model.

According to the experimental method, sequential fracturing is performed on the loaded first fracturing model, and the sequential fracturing includes the following steps:
rotating the first fracturing wellbore so that the radial distribution direction of the first fracturing perforation pair along the axial direction is consistent with the radial distribution direction of the sleeve perforation pair at the corresponding position, and injecting fracturing fluid or fracturing gas into the first fracturing wellbore for a first fracturing stage; specifically, in the first fracturing stage, the corresponding photoelastic fringe image is obtained by the optical phase shift method;
then rotating the first fracturing wellbore so that the radial distribution direction of the second fracturing perforation pair along the axial direction is consistent with the radial distribution direction of the sleeve perforation pair at the corresponding position, and injecting fracturing fluid or fracturing gas into the first fracturing wellbore for a second fracturing stage; specifically, in the second fracturing stage, the corresponding photoelastic fringe image is obtained by the optical phase shift method;

repeating the above until the fracturing of the last fracturing perforation pair is completed.

According to the experimental method described above, the horizontal well fracturing model includes a second fracturing model for simultaneous fracturing; the fracturing wellbore includes a second fracturing wellbore for simultaneous fracturing, and the radial distribution directions of multiple fracturing perforation pairs of the second fracturing wellbore are consistent; the second fracturing model is formed after the second fracturing wellbore, the outer sleeve and the reservoir 3D model are composed, and the radial distribution direction of each fracturing perforation pair of the second fracturing wellbore is consistent with the distribution direction of the sleeve perforation pair at the corresponding position.

According to the experimental method, the digital model further includes multiple preset fracture spaces distributed along an axial direction of the preset wellbore space; the number of the preset fracture spaces is the same as the number of the sleeve perforation pairs;

when the wellbore assembly is inserted into the reservoir 3D model, multiple sleeve perforation pairs of the outer sleeve correspond to the positions of multiple preset fracture spaces of the reservoir 3D model one by one, and the radial distribution direction of each sleeve perforation pair is consistent with the extension direction of the corresponding preset fracture space.

According to the experimental method mentioned above, the production method of the reservoir 3D model is as follows: the reservoir 3D model is printed by a 3D printer, and the main body of the reservoir 3D model is printed by 3D printing materials with similar composition and proportion to the real reservoir, and the preset wellbore space and the preset fracture space are printed by soluble support materials.

According to the experimental method, the reservoir 3D model is sequentially subjected to constant temperature, grinding and polishing treatment, and then the reservoir 3D model is assembled with the wellbore assembly to form the horizontal well fracturing model.

According to the experimental method, the photoelastic fringe image is unpacked to obtain the stress field distribution of the horizontal well fracturing model in the fracturing stage.

The present application further provides an experimental system for simulating the evolution of reservoir fracture stress field, includes:

a horizontal well fracturing model;

a loading device for installing the horizontal well fracturing model and applying loads and constraints to the horizontal well fracturing model;

a pumping device for injecting fracturing fluid or fracturing gas into the fracturing wellbore of the horizontal well fracturing model;

a photoelastic experiment device for obtaining the photoelastic fringe image of the horizontal well fracturing model during the fracturing stage; the fracturing stage includes an initial state before fracturing fluid or fracturing gas is injected and an end state after fracturing is completed.

According to the experimental system, the photoelastic experiment device includes a light source, a polarizer, a first quarter-wave plate, a second quarter-wave plate, an analyzer and an image acquisition element distributed in a listed sequence, the centers of the polarizer, the first quarter-wave plate, the second quarter-wave plate, the analyzer and the image acquisition element are located on the same horizontal line; the loading device is located between the first quarter-wave plate and the second quarter-wave plate.

According to the experimental system, the horizontal well fracturing model includes a reservoir 3D model and a wellbore assembly built in the reservoir 3D model, the wellbore assembly includes an outer sleeve and the fracturing wellbore inserted in the outer sleeve, and the outer sleeve is fixedly inserted in the reservoir 3D model and tightly matched with the reservoir 3D model;

the reservoir 3D model is a reservoir 3D model made of materials with photosensitivity and stress birefringence effect;

the outer sleeve has multiple sleeve perforation pairs distributed along an axial direction, two sleeve perforations of each sleeve perforation pair are distributed along a radial direction of the outer sleeve, and the radial distribution direction of each sleeve perforation pair is consistent;

the fracturing wellbore has fracturing perforation pairs with the same number as the sleeve perforation pairs, two fracturing perforations of each fracturing perforation pair are distributed along a radial direction of the fracturing wellbore, and multiple fracturing perforation pairs are distributed along an axial direction of the fracturing wellbore and correspond to the axial positions of multiple sleeve perforation pairs one by one;

the circumference of the position where each of the fracturing perforation pairs of the fracturing wellbore is provided with a sealing structure except the position between the fracturing perforation and the outer sleeve.

In the above-mentioned experimental system, the horizontal fracturing model includes a first fracturing model; the fracturing wellbore includes a first fracturing wellbore, and multiple fracturing perforation pairs of the first fracturing wellbore are staggered in a circumferential direction of the first fracturing wellbore; the first fracturing wellbore, the outer sleeve and the reservoir 3D model form the first fracturing model.

According to the experimental system, multiple fracturing perforation pairs of the first fracturing wellbore are uniformly distributed along the circumferential direction of the first fracturing wellbore.

The above-mentioned experimental system further includes a driving component connected with the first fracturing wellbore, and the driving component is configured to drive the first fracturing wellbore to rotate relative to the outer sleeve.

In the above-mentioned experimental system, the horizontal fracturing model includes a second fracturing model; the fracturing wellbore includes a second fracturing wellbore, and the radial distribution direction of multiple fracturing perforation pairs in the second fracturing wellbore is consistent with the distribution direction of sleeve perforation pairs at corresponding positions; the second fracturing wellbore, the outer sleeve and the reservoir 3D model form the second fracturing model.

In the above-mentioned experimental system, the sealing structure includes a convex part extending radially outward from the outer wall of the fracturing wellbore.

In the above-mentioned experimental system, the sealing structure further includes a sealing layer fixed to the outer peripheral surface of the convex part.

In the above-mentioned experimental system, the reservoir 3D model further includes multiple preset fractures distributed along an axial direction of the wellbore assembly, and the number of the preset fractures is the same as the number of the sleeve perforation pairs;

multiple preset fractures correspond to the positions of multiple sleeve perforation pairs of the outer sleeve one-to-one, and the extending direction of each of the preset fractures is consistent with the radial distribution direction of the sleeve perforation pair at the corresponding position.

The above-mentioned experimental system further includes an image solver, the image solver is configured to process the photoelastic fringe image obtained by the photoelastic experiment device to obtain the stress field distribution of the horizontal well fracturing model in the fracturing stage.

The experimental method and system for simulating the evolution of reservoir fracturing stress field provided by the present application can simulate the whole process of horizontal well fracturing. Specifically, after boundary loads and constraints are applied to the horizontal well fracturing model, fracturing fluid or fracturing gas is injected into the fracturing wellbore for fracturing, and photoelastic fringe images of the horizontal well fracturing model are obtained through the optical phase shift method in the whole fracturing stage, which may be realized by a photoelastic experiment device. In this way, the state of the horizontal well fracturing model at any node in the fracturing stage may be obtained according to the requirements, and the internal stress field distribution may be visually displayed, which provides a basis for the subsequent analysis of the changes and mutual interference of the reservoir stress field in the fracturing process, thus accurately obtaining the variation law of the reservoir stress field and the influence of the stress field changes on crack propagation in the fracturing process of horizontal wells.

Figure 1:
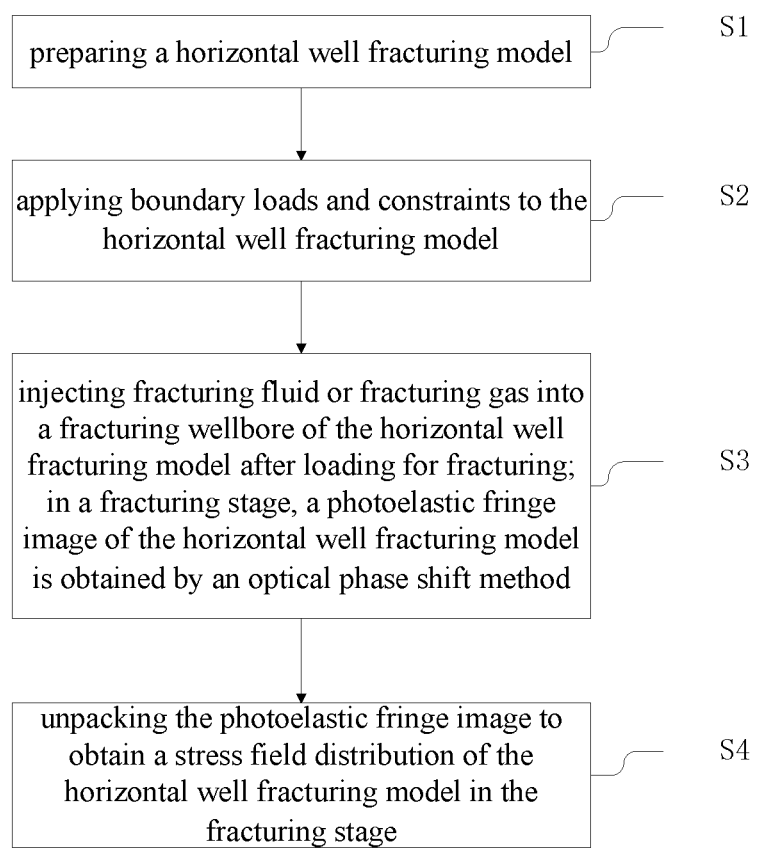
FIG. 1 is a flow diagram of an embodiment of an experimental method for simulating the evolution of reservoir fracturing stress field provided by the present application.

Reference numbers in the drawings are listed as follows:
horizontal well fracturing model 100,
reservoir 3D model 110,
preset fracture 111,
outer sleeve 120,
sleeve perforation pair 121,
sleeve perforation 121a,
fracturing wellbore 130,
first fracturing wellbore 131,
fracturing perforation pair 1311,
convex part 1312,
loading device 200,
pumping device 300,
light source 410,
polarizer 420,
first quarter-wave plate 430,
second quarter-wave plate 440,
analyzer 450,
image acquisition element 460,
driving component 500.

DETAILED DESCRIPTION

In order to make the person skilled in the art have a better understanding of solutions of the present application, the present application will be described in further detail hereinafter, in conjunction with the drawings and embodiments.

For convenience of understanding and conciseness of description, the following description is combined with the experimental method and system for simulating the evolution of reservoir fracturing stress field, and the beneficial effects will not be repeated.

Figure 2:
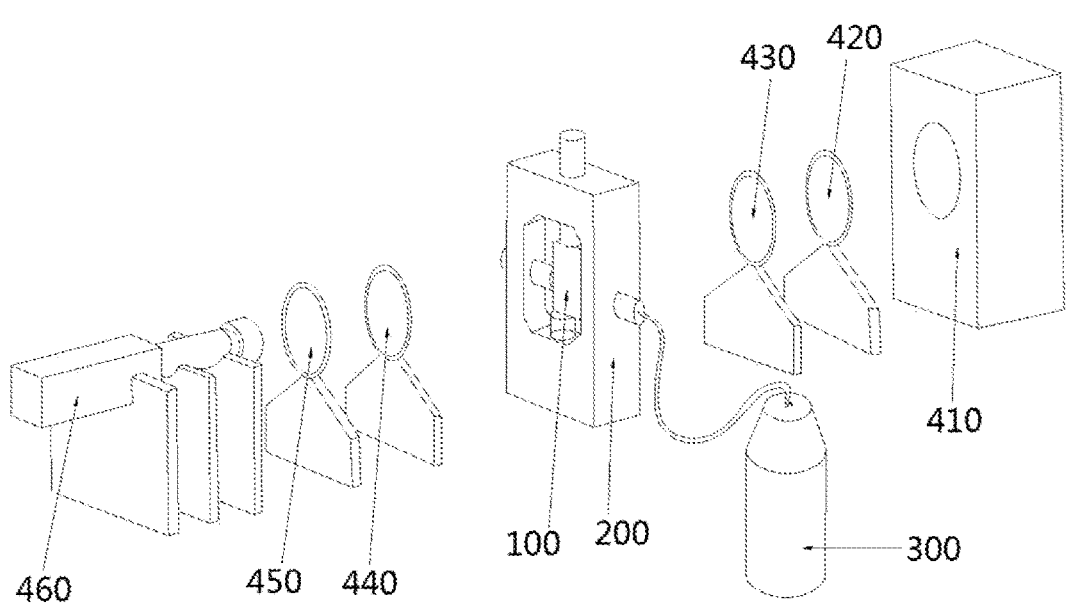
FIG. 2 is a structural schematic diagram of an embodiment of the experimental system for simulating the evolution of reservoir fracturing stress field provided by the present application.

Referring to FIG. 1 and FIG. 2, FIG. 1 is a flow diagram of an embodiment of an experimental method for simulating the evolution of a reservoir fracturing stress field provided by the present application; FIG. 2 is a structural schematic diagram of an embodiment of the experimental system for simulating the evolution of the reservoir fracturing stress field provided by the present application.

In this embodiment, the experimental method for simulating the evolution of the reservoir fracturing stress field includes the following steps:

S1, preparing a horizontal well fracturing model 100;

S2, applying boundary loads and constraints to the horizontal well fracturing model 100;

S3, injecting fracturing fluid or fracturing gas into a fracturing wellbore 130 of the horizontal well fracturing model 100 after loading for fracturing; in the fracturing stage, obtaining a photoelastic fringe image of the horizontal well fracturing model 100 by a optical phase shift method;

In this embodiment, the experimental system for simulating the evolution of the reservoir fracturing stress field includes:

a horizontal well fracturing model 100;

a loading device 200 for installing the horizontal well fracturing model 100 and applying loads and constraints to the horizontal well fracturing model 100;

a pumping device 300 for injecting fracturing fluid or fracturing gas into the fracturing wellbore 130 of the horizontal well fracturing model 100;

a photoelastic experiment device for obtaining the photoelastic fringe image of the horizontal well fracturing model 100 during the fracturing stage.

It should be noted that, the fracturing stage mentioned above includes an initial state before fracturing fluid or fracturing gas is injected and an end state after fracturing is completed. That is to say, according to actual needs, the photoelastic fringe image of the horizontal well fracturing model 100 in the initial state may be acquired after loading and before injecting fracturing fluid or fracturing gas, and the photoelastic fringe image of the horizontal well fracturing model 100 in the fracturing end state may be acquired after injecting fracturing fluid or fracturing gas.

It should also be noted that, in this embodiment, photoelastic stripes of the horizontal well fracturing model 100 need to be highlighted by optical phase shift method using photoelastic experiment device in the fracturing stage of the horizontal well fracturing model 100. Apparently, the produced horizontal well fracturing model 100 has photosensitivity and stress birefringence effect.

The experimental method and system for simulating the evolution of the reservoir fracturing stress field provided by the embodiment may simulate the whole process of horizontal well fracturing. Specifically, after boundary loads and constraints are applied to the horizontal well fracturing model 100, fracturing fluid or fracturing gas is injected into the fracturing wellbore 130 for fracturing, and photoelastic fringe images of the horizontal well fracturing model 100 are obtained through the optical phase shift method in the whole fracturing stage, The optical phase shift method may be realized by the photoelastic experiment device. In this way, the state of the horizontal well fracturing model 100 at any node in the fracturing stage may be obtained according to the requirements, and may be visually displayed, which provides a basis for the subsequent analysis of the changes and mutual interference of the reservoir stress field in the fracturing process, thus accurately obtaining the variation law of the reservoir stress field and the influence of the stress field changes on crack propagation in the fracturing process of a horizontal well.

Further, the experimental method further includes the following steps after the above step S3:

S4, unpacking the obtained photoelastic fringe image to obtain the stress field distribution of the horizontal well fracturing model 100 in the fracturing stage.

Correspondingly, the experimental system further includes an image solver, which is configured to process the photoelastic fringe image obtained by the photoelastic experiment device, so as to obtain the stress field distribution of the horizontal well fracturing model 100 in the fracturing stage.

As mentioned above, during the whole fracturing stage, photoelastic fringe images of the horizontal well fracturing model at any node may be obtained according to the requirements. After these images are processed, the stress field changes (such as shear stress, principal stress difference, etc.) of the horizontal well fracturing model in the fracturing stage and the influence of these stress field changes on crack propagation are known, and the accuracy and reliability of the results is guaranteed.

In a specific solution, in the foregoing step S1, that preparing the horizontal well fracturing model 100 includes:

S11, establishing a digital model of a real reservoir, in which the digital model has a preset wellbore space; making a reservoir 3D model 110 according to the digital model, in which the material of the reservoir 3D model 110 is similar to the real reservoir in composition and ratio, and has photosensitivity and stress birefringence effects;

S12, preparing a wellbore assembly, in which the wellbore assembly includes an outer sleeve 120 and the fracturing wellbore 130 inserted in the outer sleeve 120;

S13, inserting the wellbore assembly into the preset wellbore space of the prepared reservoir 3D model 110 to form the horizontal well fracturing model 100, in which the outer sleeve 120 is tightly matched with the reservoir 3D model 110.

In an actual operation of S11, the real reservoir to be simulated may be digitally reconstructed. Digital reconstruction is to utilize actual engineering parameters to establish a numerical model in numerical software through a numerical method.

For the real reservoir, a real core may be drilled and extracted from the rock formations, laboratory-scale mechanics and property tests may be performed on the real core to obtain relevant parameters, and the parameters may be assigned to the numerical model, so that the numerical model and the real reservoir keep the same properties.

Specifically, when the reservoir 3D model 110 is made according to the digital model, it is printed by a 3D printer and a main body of the reservoir 3D model 110 may be printed by a 3D printing material with similar composition and proportion to the real reservoir. The preset wellbore space in the reservoir 3D model 110 may be printed with a soluble support material. In the subsequent processing, the soluble support material may be dissolved and processed without affecting subsequent assembly with the wellbore assembly.

More specifically, after the reservoir 3D model 110 is made by the 3D printer, the 3D printed model of the reservoir is further processed, such as removing the surface support material of the conventional 3D printed model, and then constant temperature process, grinding process and polishing process which may be sequentially performed.

The 3D printed model of the reservoir may be thermostatically treated with a thermostat. For example, the temperature may be slowly raised first, and then the temperature may be raised to the set temperature (such as 30° C.), and then the constant temperature may be sealed for a set time (such as 48 hours) to ensure the stability of the 3D printed model.

In S12, the outer sleeve 120 has multiple sleeve perforation pairs 121 distributed along an axial direction, two sleeve perforations 121a of each sleeve perforation pair 121 are distributed along a radial direction of the outer sleeve 120, and the radial distribution direction of each sleeve perforation pair 121 is consistent.

It may be understood that a connecting line of the two sleeve perforations 121a of each sleeve perforation pair 121 passes through the center of the outer sleeve 120, the radial distribution direction of each sleeve perforation pair 121 mentioned above may be understood as the connecting line directions of two sleeve perforations 121a of each sleeve perforation pair 121 being parallel, and the radial distribution direction mentioned below is consistent with this explanation, so the description will not be repeated.

The fracturing wellbore 130 has fracturing perforation pairs having the same number with the sleeve perforation pairs 121 (not shown in FIG. 2), two fracturing perforations of each fracturing perforation pair are distributed along a radial direction of the fracturing wellbore, and multiple fracturing perforation pairs are distributed along an axial direction of the fracturing wellbore 130 and correspond to the axial positions of multiple sleeve perforation pairs 121 one by one.

Meanwhile, the circumference of the position where each fracturing perforation pair of the fracturing wellbore 130 is located is hermetical except the position between the fracturing perforation and the outer sleeve 120.

That is, the circumference of the position where each of the fracturing perforation pairs of the fracturing wellbore 130 is provided with a sealing structure except the position between the fracturing perforation and the outer sleeve 120.

In practice, both the outer sleeve 120 of the wellbore assembly and the fracturing wellbore 130 may be made of metal.

In S13, the outer sleeve 120 and the reservoir 3D model 110 are tightly matched to ensure the tightness between the two and achieve the effect of no liquid or gas leaking during the high-pressure fracturing process.

It should be noted here that the order of the above steps S11 and S12 may be exchanged. In an actual operation, the steps S11 and S12 are not strictly sequential, and they may also be performed at the same time.

After the horizontal well fracturing model 100 is prepared, the foregoing step S2 is performed. In an actual operation, the loading device 200 may adopt a biaxial loading chamber or other loading structures. It may be understood that after the horizontal well fracturing model 100 is mounted in the loading device 200, an axis of the wellbore assembly therein is parallel to a horizontal direction.

The constraints imposed on the horizontal well fracturing model 100 make its boundary not deform during the whole fracturing process. Of course, in application, the imposed constraints may also be determined according to actual requirements, and are not limited to this.

The load applied to the horizontal well fracturing model 100 may be calculated according to a similar theory to calculate the specific value of the boundary load of the model, so as to simulate the conditions of the real reservoir, and then the load is applied to the horizontal well fracturing model 100 by the loading device 200.

After the load and constraint are applied, a pumping device 300 injects fracturing fluid or fracturing gas into the fracturing wellbore 130 of the horizontal well fracturing model at a constant pressure or a constant speed for fracturing.

In a further solution, in order to make the initiation direction of the fracturing cracks follow a set direction during the fracturing process, a preset fracture 111 may also be set inside the model when the horizontal well fracturing model 100 is being prepared.

Specifically, when the digital model of the real reservoir is being established, multiple preset fracture spaces distributed along the axial direction of the preset wellbore space are also set in the digital model, and the number of the preset fracture spaces is the same as the number of the sleeve perforation pairs 121 of the outer sleeve 120. When the wellbore assembly is inserted into the reservoir 3D model 110, multiple sleeve perforation pairs 121 of the outer sleeve 120 correspond to the multiple preset fracture spaces one by one, and the radial distribution direction of each sleeve perforation pair 121 is consistent with the extension direction of the corresponding preset fracture space.

When the reservoir 3D model 110 is printed by a 3D printer, similar to the aforementioned preset wellbore space, the preset fracture space is printed via a soluble support material. In the subsequent treatment, the soluble support material may be dissolved, so that the preset fracture 111 is formed in the preset fracture space of the reservoir 3D model 110.

After this setting, during the fracturing process, an initiation direction of the fracturing crack is along the extension direction of the preset fracture 111.

In a specific solution, the photoelastic experiment device includes a light source 410, a polarizer 420, a first quarter-wave plate 430, a second quarter-wave plate 440, an analyzer 450 and an image acquisition element 460 distributed in a listed sequence, the centers of the polarizer 420, the first quarter-wave plate 430, the second quarter-wave plate 440, the analyzer 450 and the image acquisition element 460 are located on the same horizontal line; the loading device 200 is located between the first quarter-wave plate 430 and the second quarter-wave plate 440.

In the fracturing process, the optical phase shift technology may specifically adopt a ten-step phase shift method, or may also adopt a six-step phase shift method or a four-step phase shift method, which is specifically selected according to the actual situation. In each phase shift method, there are detailed regulations on how to rotate each part of the photoelastic experiment device, which may be operated according to the corresponding phase shift method, and no detailed description is given here.

The image acquisition element 460 may specifically be a CCD camera, of course, a single-lens reflex camera or a digital video camera and other devices capable of image acquisition may also be used.

The experimental method and system provided in this embodiment may realize a sequential fracturing and a simultaneous fracturing in horizontal well staged fracturing, and the horizontal well fracturing models 100 corresponding to the two types of fracturing are different.

In this embodiment, the horizontal well fracturing model 100 specifically includes a first fracturing model for realizing the sequential fracturing and a second fracturing model for realizing the simultaneous fracturing.

It should be noted that regardless of the first fracturing model or the second fracturing model, the structures and preparation methods of the reservoir 3D models 110 of them are the same, and the structures of the outer sleeves 120 of the wellbore assemblies of them is also the same. In other words, the distribution of the sleeve perforation pairs 121 of the outer sleeve 120 is consistent with the distribution and the corresponding relationship of the preset fractures 111 in the reservoir 3D model 110. The difference between the first fracturing model and the second fracturing model lies in the distribution of the multiple fracturing perforation pairs 1311 of the fracturing wellbore 130, and the positions of the sealing between the fracturing wellbore 130 and the outer sleeve 120 mentioned above are similar.

In actual setting, the reservoir 3D model 110 and the outer sleeve 120 of the first fracturing model and the second fracturing model may be shared. The fracturing wellbore of the first fracturing model is called the first fracturing wellbore 131, and the fracturing wellbore of the second fracturing model is called the second fracturing wellbore. In application, the fracturing model may be changed only by replacing the fracturing wellbore 130.

That is to say, in preparation, for simplification, the reservoir 3D model 110 and the outer sleeve 120 may be prepared, a first fracturing wellbore 131 for sequential fracturing may be prepared, and a second fracturing wellbore for simultaneous fracturing may be prepared. The first fracturing wellbore 131, the reservoir 3D model and the outer sleeve 120 are assembled to form the first fracturing model for sequential fracturing, and the second fracturing wellbore, the reservoir 3D model 110 and the outer sleeve 120 are assembled to form the second fracturing model for simultaneous fracturing.

The above-mentioned related arrangement of the fracturing wellbore 130 is applicable to the first fracturing wellbore 131 and the second fracturing wellbore.

The specific structure and experimental process of the two fracturing models are described below.

Figure 4:
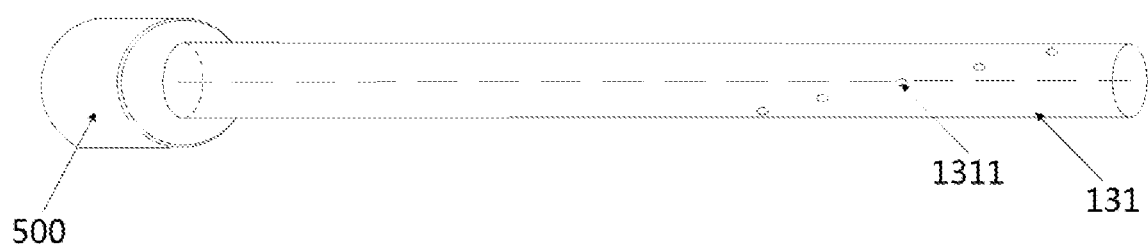
FIG. 4 is a structural schematic diagram of the first fracturing wellbore of the horizontal well fracturing model in a specific embodiment.
Figure 5:
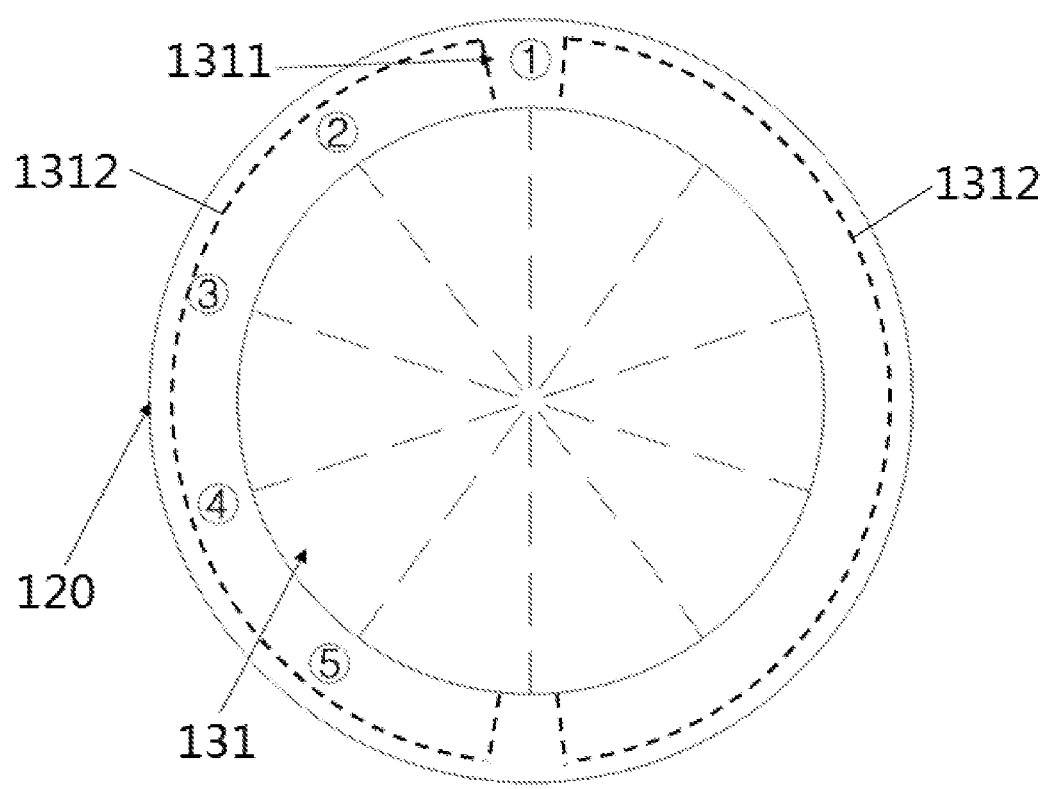
FIG. 5 is a schematic cross-sectional view of the wellbore assembly consisting of the first fracturing wellbore and the outer sleeve shown in FIG. 4.

For the first fracturing model, multiple fracturing perforation pairs 1311 of the first fracturing wellbore 131 are arranged along the axial direction as described above, and the axial positions correspond to the sleeve perforation pairs 121 of the outer sleeve 120 one by one; multiple fracturing perforation pairs 1311 are staggered in the circumferential direction of the first fracturing wellbore 131, which is understood with reference to FIGS. 4 and 5, where the position distribution of five fracturing perforation pairs 1311 of the first fracturing wellbore is indicated by serial numbers ①-⑤ in FIG. 5.

In specific setting, multiple fracturing perforation pairs 1311 are uniformly distributed along the circumferential direction of the first fracturing wellbore 131, that is, included angles between any two adjacent fracturing perforation pairs, which may be understood as the included angles between the radial distribution directions of two adjacent fracturing perforation pairs, are the same.

Figure 3:
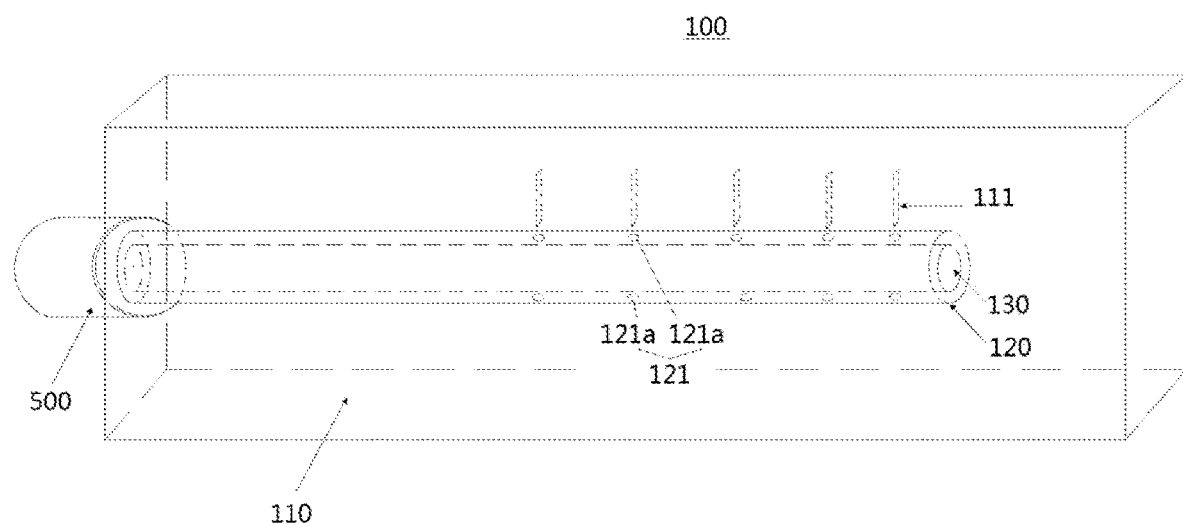
FIG. 3 is a structural schematic diagram of a horizontal well fracturing model in a specific embodiment.

In the illustrated solution, the structure that the first fracturing wellbore 131 has five fracturing perforation pairs 1311 is exemplarily shown. In FIG. 3, there are 5 preset fractures 111 in the reservoir 3D model 110, and there also are 5 sleeve perforation pairs 121 in the outer sleeve 120.

In the first fracturing model formed after assembly, the first fracturing wellbore 131 is rotatable relative to the outer sleeve 120. In actual experiment, a special driving component 500 may be set to connect with the first fracturing wellbore 131, and the first fracturing wellbore 131 may be driven to rotate by the driving component 500. Of course, the driving component 500 may not be provided, and the first fracturing wellbore 131 may be rotated manually.

When the first fracturing model is used for sequential fracturing, the fracturing steps include:

rotating the first fracturing wellbore 131 so that the radial distribution direction of the first fracturing perforation pair 1311 along the axial direction is consistent with the radial distribution direction of the sleeve perforation pair 121 at the corresponding position; in actual application, the sequential fracturing starts from an end of the wellbore, with the orientation shown in FIGS. 3 and 4, the first fracturing perforation pair is the rightmost fracturing perforation pair, that is, fracturing sequentially along the axial direction from right to left in the illustrated orientation, in the orientation shown in FIG. 3, the radial distribution direction of each sleeve perforation pair 121 of the outer sleeve 120 is the vertical direction, Of course, the extension direction of the preset fracture 111 is also the vertical direction, that is, the first fracturing wellbore 131 is first rotated so that the radial distribution direction of the first fracturing perforation pair on the right is also the vertical direction.

It may be understood that because the fracturing perforation pairs 1311 of the first fracturing wellbore 131 are staggered in the circumferential direction, at this time, the radial distribution directions of the other fracturing perforation pairs except the first fracturing perforation pair are at certain angles with the vertical direction, and because the first fracturing wellbore 131 is sealed between the position of each fracturing perforation pair 1311 and the outer sleeve 120, only the first fracturing perforation pair of the first fracturing wellbore 131 at this time communicates with the sleeve perforation pair 121 at the corresponding position, and other positions between the first fracturing wellbore 131 and the outer sleeve 120 are sealed.

Then, fracturing fluid or fracturing gas is injected into the first fracturing wellbore 131 to perform a first fracturing stage, and in the first fracturing stage, a corresponding photoelastic fringe image is acquired by the optical elastic experiment device through an optical phase shift method; as described before, the fracturing fluid performs fracturing at the first fracturing perforation pair position due to sealing of other fracturing perforation pair positions.

After the first fracturing stage is completed, the first fracturing wellbore 131 is rotated to make the radial distribution direction of the second fracturing perforation pair counted from right to left of the first fracturing wellbore 131 consistent with the radial distribution direction of the sleeve perforation pair 121 at the corresponding position. That is to say, the radial distribution direction of the second fracturing perforation pair is the vertical direction shown in the figure. At this time, the second fracturing perforation pair is communicated with the sleeve perforation pair 121 at the corresponding position, and other positions of the wellbore assembly are in a sealed state. Fracturing fluid or fracturing gas is injected into the first fracturing wellbore 131 to perform a second fracturing stage, and in the second fracturing stage, a corresponding photoelastic fringe image is acquired by the optical elastic experiment device through the optical phase shift method;

The above is repeated until all the fracturing perforation pairs have completed fracturing.

It may be understood that when the first fracturing wellbore 131 is rotated, its rotation direction is not limited, and it may be rotated clockwise or counterclockwise.

Referring to FIG. 5, in a specific arrangement, the sealing structure between the first fracturing wellbore 131 and the outer sleeve 120 at the position of its fracturing perforation pair 1311 includes a convex part 1312 extending radially outward from the outer peripheral wall of the first fracturing wellbore 131. Since each fracturing perforation pair has two fracturing perforations distributed in the radial direction, it may be understood that there are actually two arc-shaped convex parts 1312 at each fracturing perforation pair position, and the convex parts 1312 at the position of the first fracturing perforation pair are illustrated by dashed lines in FIG. 5. Sealing between the first fracturing wellbore 131 and the outer sleeve 120 is realized by the convex part 1312, so that after the positions correspond, the first fracturing wellbore 131 may only communicate with the sleeve perforation pair 121 through the fracturing perforation pair at the corresponding position.

Further, the sealing structure may also include a sealing layer arranged on the outer peripheral surface of the convex part 1312, which may be a coated sealant layer or other sealing materials fixedly attached to the outer peripheral surface of the convex part 1312 by gluing, etc. In practical application, the sealing materials may be determined according to requirements.

For the second fracturing model, multiple fracturing perforation pairs of the second fracturing wellbore are also distributed along the axial direction as mentioned above, and the axial positions correspond to the sleeve perforation pairs 121 of the outer sleeve 120 one by one; the radial distribution direction of the multiple fracturing perforation pairs of the second fracturing wellbore is the same, and is consistent with the distribution direction of the sleeve perforation pair 121 at the corresponding position.

It may be understood that after this arrangement, in the orientation shown in FIG. 3, the radial distribution directions of multiple fracturing perforation pairs in the second fracturing wellbore of the second fracturing model are all vertical, which are consistent with the distribution direction of sleeve perforation pairs 121 at corresponding positions and the extension direction of preset fractures 111, so that the second fracturing wellbore and outer sleeve 120 are communicated at all perforation positions.

Similarly, a sealing structure is also provided between the second fracturing wellbore and the outer sleeve 120 at the location of the fracturing perforation pair, so that after assembly, the second fracturing wellbore and the outer sleeve 120 may only communicate with each perforation at the corresponding location, that is, during fracturing, fracturing fluid or fracturing gas may only flow at the perforation location.

The sealing structure between the second fracturing wellbore and the outer sleeve 120 is similar to the aforementioned sealing structure between the first fracturing wellbore and the outer sleeve 120.

When the second fracturing model is used for simultaneous fracturing, the fracturing step is to inject fracturing fluid or fracturing gas from the second fracturing wellbore for fracturing, and each perforation pair is subjected to fracturing operation at the same time until the fracturing stage is completed. Similarly, in the fracturing stage, photoelastic experiment device is configured to obtain the required photoelastic fringe image by optical phase shift method.

The experimental method and system for simulating the evolution of reservoir fracturing stress field provided by the present application have been introduced in detail above. The principle and the embodiments of the present application are illustrated herein by specific examples. The above description of examples is only intended to facilitate the understanding of the method and spirit of the present application. It should be noted that, for those skilled in the art, many modifications and improvements may be made to the present application without departing from the principle of the present application, and these modifications and improvements are also deemed to fall into the protection scope of the present application defined by the claims.

What is claimed is:

1. An experimental method for simulating evolution of a reservoir fracturing stress field, comprising the following steps:

preparing a horizontal well fracturing model;

applying boundary loads and constraints to the horizontal well fracturing model;

injecting fracturing fluid or fracturing gas into a fracturing wellbore of the horizontal well fracturing model after loading for fracturing; wherein in a fracturing stage, a photoelastic fringe image of the horizontal well fracturing model is obtained by an optical phase shift method; the fracturing stage comprises an initial state before fracturing fluid or fracturing gas is injected and an end state after fracturing is completed, wherein that preparing the horizontal well fracturing model comprises the following steps:

establishing a digital model of a real reservoir, in which the digital model of a real reservoir has a preset wellbore space;

making a reservoir 3D model according to the digital model of a real reservoir, in which the material of the reservoir 3D model is same to a real reservoir in composition and ratio, and has photosensitivity and stress birefringence effects;

preparing a wellbore assembly, in which the wellbore assembly comprises an outer sleeve and the fracturing wellbore inserted in the outer sleeve; the outer sleeve has a plurality of sleeve perforation pairs distributed along an axial direction, two sleeve perforations of each sleeve perforation pair are distributed along a radial direction of the outer sleeve, and the radial distribution direction of each sleeve perforation pair is consistent; the fracturing wellbore has fracturing perforation pairs having the same number with the sleeve perforation pairs, two fracturing perforations of each fracturing perforation pair are distributed along a radial direction of the fracturing wellbore, and a plurality of fracturing perforation pairs are distributed along an axial direction of the fracturing wellbore and correspond to axial positions of the plurality of sleeve perforation pairs one by one; the circumference of the position where each fracturing perforation pair of the fracturing wellbore is located is sealed except a position between the fracturing perforation and the outer sleeve;

inserting the wellbore assembly into a preset wellbore space of the reservoir 3D model to form the horizontal well fracturing model, in which the outer sleeve is tightly matched with the reservoir 3D model, which ensures the tightness between the two and achieve the effect of no liquid or gas leaking during the high-pressure fracturing process, the experimental method is configured to effectively simulate the whole process of horizontal well fracturing, which realizes control of the changes and mutual interference of the reservoir stress field in the fracturing process.

2. The experimental method according to claim 1, wherein the horizontal well fracturing model comprises a first fracturing model for sequential fracturing; the fracturing wellbore comprises a first fracturing wellbore for sequential fracturing, wherein a plurality of fracturing perforation pairs of the first fracturing wellbore are staggered in the circumferential direction of the first fracturing wellbore; the first fracturing wellbore, the outer sleeve and the reservoir 3D model are assembled to form the first fracturing model.

3. The experimental method according to claim 2, wherein sequential fracturing is performed on the first fracturing model which is loaded, and the sequential fracturing comprises the following steps:

rotating the first fracturing wellbore so that the radial distribution direction of the first fracturing perforation pair along the axial direction is consistent with the radial distribution direction of the sleeve perforation pair at the corresponding position, and injecting fracturing fluid or fracturing gas into the first fracturing wellbore for a first fracturing stage; in the first fracturing stage, the corresponding photoelastic fringe image is obtained by the optical phase shift method;

then rotating the first fracturing wellbore so that the radial distribution direction of the second fracturing perforation pair along the axial direction is consistent with the radial distribution direction of the sleeve perforation pair at the corresponding position, and injecting fracturing fluid or fracturing gas into the first fracturing wellbore for a second fracturing stage; in the second fracturing stage, the corresponding photoelastic fringe image is obtained by the optical phase shift method;

repeating the above until the fracturing of the last fracturing perforation pair is completed.

4. The experimental method according to claim 1, wherein the horizontal well fracturing model comprises a second fracturing model for simultaneous fracturing; the fracturing wellbore comprises a second fracturing wellbore for simultaneous fracturing, and the radial distribution directions of the plurality of fracturing perforation pairs of the second fracturing wellbore are consistent; the second fracturing model is formed after the second fracturing wellbore, the outer sleeve and the reservoir 3D model are composed, wherein the radial distribution direction of each fracturing perforation pair of the second fracturing wellbore is consistent with the distribution direction of the sleeve perforation pair at the corresponding position.

5. The experimental method according to claim 1, wherein the digital model of a real reservoir further comprises a plurality of preset fracture spaces distributed along an axial direction of the preset wellbore space; the number of the preset fracture spaces is the same as the number of the sleeve perforation pairs;

when the wellbore assembly is inserted into the reservoir 3D model, the plurality of sleeve perforation pairs of the outer sleeve correspond to the positions of the plurality of preset fracture spaces of the reservoir 3D model one by one, and a radial distribution direction of each sleeve perforation pair is consistent with an extension direction of the corresponding preset fracture space.

6. The experimental method according to claim 5, wherein the production method of the reservoir 3D model is as follows: the reservoir 3D model is printed by a 3D printer, and a main body of the reservoir 3D model is printed by 3D printing materials with same composition and proportion to the real reservoir, and the preset wellbore space and the preset fracture space are printed by soluble support materials.

7. The experimental method according to claim 6, wherein the printed reservoir 3D model is sequentially subjected to constant temperature, grinding and polishing treatment, and then the treated reservoir 3D model is assembled with the wellbore assembly to form the horizontal well fracturing model.

8. An experimental system for simulating evolution of a reservoir fracture stress field, comprising:
- a horizontal well fracturing model;
- a loading device for installing the horizontal well fracturing model and applying loads and constraints to the horizontal well fracturing model;
- a pump for injecting fracturing fluid or fracturing gas into the fracturing wellbore of the horizontal well fracturing model;
- a photoelastic experiment device for obtaining a photoelastic fringe image of the horizontal well fracturing model during the fracturing stage, wherein the fracturing stage comprises an initial state before fracturing fluid or fracturing gas is injected and an end state after fracturing is completed,
- wherein the photoelastic experiment device comprises a light source, a polarizer, a first quarter-wave plate, a second quarter-wave plate, an analyzer and an image acquisition element distributed in a listed sequence, the centers of the polarizer, the first quarter-wave plate, the second quarter-wave plate, the analyzer and the image acquisition element are located on the same horizontal line; the loading device is located between the first quarter-wave plate and the second quarter-wave plate,
- wherein the horizontal well fracturing model comprises a reservoir 3D model and a wellbore assembly built in the reservoir 3D model, the wellbore assembly comprises an outer sleeve and the fracturing wellbore inserted in the outer sleeve, and the outer sleeve is fixedly inserted in the reservoir 3D model and tightly matched with the reservoir 3D model, which ensures the tightness between the two and achieve the effect of no liquid or gas leaking during the high-pressure fracturing process;
- the reservoir 3D model is a reservoir 3D model made of materials with photosensitivity and stress birefringence effect;
- the outer sleeve has a plurality of sleeve perforation pairs distributed along an axial direction, two sleeve perforations of each sleeve perforation pair are distributed along a radial direction of the outer sleeve, and a radial distribution direction of each sleeve perforation pair is consistent;
- the fracturing wellbore has fracturing perforation pairs having the same number with the sleeve perforation pairs, two fracturing perforations of each fracturing perforation pair are distributed along a radial direction of the fracturing wellbore, and the plurality of fracturing perforation pairs are distributed along an axial direction of the fracturing wellbore and correspond to axial positions of a plurality of sleeve perforation pairs one by one;
- the circumference of the position where each of the fracturing perforation pairs of the fracturing wellbore is located is provided with a sealing structure except a position between the fracturing perforation and the outer sleeve,
- the experimental system is configured to effectively simulate the whole process of horizontal well fracturing, which realizes control of the changes and mutual interference of the reservoir stress field in the fracturing process.

9. The experimental system according to claim 8, wherein the horizontal fracturing model comprises a first fracturing model; the fracturing wellbore comprises a first fracturing wellbore for sequential fracturing, wherein a plurality of fracturing perforation pairs of the first fracturing wellbore is staggered in the circumferential direction of the first fracturing wellbore; the first fracturing wellbore, the outer sleeve and the reservoir 3D model form the first fracturing model.

10. The experimental system according to claim 9, wherein the plurality of fracturing perforation pairs of the first fracturing wellbore is uniformly distributed along the circumferential direction of the first fracturing wellbore.

11. The experimental system according to claim 9, further comprising a driving component connected with the first fracturing wellbore, wherein the driving component is configured to drive the first fracturing wellbore to rotate relative to the outer sleeve.

12. The experimental system according to claim 8, wherein the horizontal fracturing model comprises a second fracturing model; the fracturing wellbore comprises a second fracturing wellbore, and the radial distribution direction of the plurality of fracturing perforation pairs in the second fracturing wellbore is consistent with the distribution direction of sleeve perforation pairs at corresponding positions; the second fracturing wellbore, the outer sleeve and the reservoir 3D model form the second fracturing model.

13. The experimental system according to claim 8, wherein the sealing structure comprises a convex part extending radially outward from an outer wall of the fracturing wellbore.

14. The experimental system according to claim 13, wherein the sealing structure further comprises a sealing layer fixed to the outer peripheral surface of the convex part.

15. The experimental system according to claim 8, wherein the reservoir 3D model further comprises a plurality of preset fractures distributed along an axial direction of the wellbore assembly, and the number of the preset fractures is the same as the number of the sleeve perforation pairs;
- the plurality of preset fractures correspond to the positions of the plurality of sleeve perforation pairs of the outer sleeve one-to-one, and an extending direction of each of the preset fractures is consistent with the radial distribution direction of the sleeve perforation pair at the corresponding position.

* * * * *